(12) United States Patent
Tamura et al.

(10) Patent No.: US 9,036,972 B2
(45) Date of Patent: May 19, 2015

(54) OPTICAL FIBER PREFORM, METHOD FOR PRODUCING OPTICAL FIBER, AND OPTICAL FIBER

(71) Applicant: SUMITOMO ELECTRIC INDUSTRIES, LTD., Osaka-shi, Osaka (JP)

(72) Inventors: Yoshiaki Tamura, Yokohama (JP); Tetsuya Haruna, Yokohama (JP); Masaaki Hirano, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/127,266

(22) PCT Filed: Nov. 16, 2012

(86) PCT No.: PCT/JP2012/079769
§ 371 (c)(1),
(2) Date: Dec. 18, 2013

(87) PCT Pub. No.: WO2013/077263
PCT Pub. Date: May 30, 2013

(65) Prior Publication Data
US 2014/0254997 A1    Sep. 11, 2014

(30) Foreign Application Priority Data
Nov. 21, 2011   (JP) .................................. 2011-253913

(51) Int. Cl.
| | | |
|---|---|---|
| G02B 6/036 | (2006.01) | |
| B29B 7/00 | (2006.01) | |
| C03B 37/02 | (2006.01) | |
| C03B 37/018 | (2006.01) | |
| C03B 37/027 | (2006.01) | |

(Continued)

(52) U.S. Cl.
CPC ...... G02B 6/03622 (2013.01); C03B 37/01807 (2013.01); C03B 2201/04 (2013.01);
(Continued)

(58) Field of Classification Search
CPC ............ G02B 6/02042; G02B 6/03644; H01S 3/06708; H01S 3/06729; C02B 2203/34
USPC ............................ 385/126; 428/542.8; 65/435
See application file for complete search history.

(56) References Cited

U.S. PATENT DOCUMENTS

| | | | |
|---|---|---|---|
| 4,733,939 A * | 3/1988 | Utsumi et al. ................ | 385/123 |
| 5,146,534 A | 9/1992 | Lines | |

(Continued)

FOREIGN PATENT DOCUMENTS

| | | |
|---|---|---|
| GB | 1598760 A | 9/1981 |
| JP | 2003-054995 A | 2/2003 |

(Continued)

Primary Examiner — Jerry Blevins
(74) Attorney, Agent, or Firm — Drinker Biddle & Reath LLP

(57) ABSTRACT

An easily producible optical fiber preform which is drawn to an optical fiber having a core containing a sufficient concentration of alkali metal is provided. An optical fiber preform 10 is composed of silica-based glass and includes a core portion 20 and a cladding portion 30. The core portion 20 includes a first core portion 21 including a central axis and a second core portion 22 disposed on the perimeter of the first core portion 21. The cladding portion 30 includes a first cladding portion 31 disposed on the perimeter of the second core portion 22 and a second cladding portion 32 disposed on the perimeter of the first cladding portion 31. The core portion 20 contains an alkali metal at an average concentration of 5 atomic ppm or more. The concentration of the OH group in the perimeter portion of the first cladding portion 31 is 200 mol ppm or more.

21 Claims, 5 Drawing Sheets

(51) Int. Cl.
*C03B 37/014* (2006.01)
*C03C 13/04* (2006.01)

(52) U.S. Cl.
CPC ....... *C03B2201/07* (2013.01); *C03B 2201/075* (2013.01); *C03B 2201/12* (2013.01); *C03B 2201/20* (2013.01); *C03B 2201/50* (2013.01); *C03B 2203/22* (2013.01); *C03B 2203/23* (2013.01); *C03B 37/01815* (2013.01); *C03B 2203/34* (2013.01); *C03B 37/018* (2013.01); *C03B 37/027* (2013.01); *C03B 37/01413* (2013.01); *C03C 13/04* (2013.01); *G02B 6/036* (2013.01)

(56) References Cited

U.S. PATENT DOCUMENTS

| | | | |
|---|---|---|---|
| 6,153,546 | A | 11/2000 | Saitoh et al. |
| 8,011,208 | B2 | 9/2011 | Balakrishnan et al. |
| 2005/0063663 | A1* | 3/2005 | Anderson et al. ............ 385/142 |
| 2006/0130530 | A1 | 6/2006 | Anderson et al. |

FOREIGN PATENT DOCUMENTS

| | | |
|---|---|---|
| JP | 2005-537210 A | 12/2005 |
| JP | 2007-504080 A | 3/2007 |
| JP | 2008-536190 A | 9/2008 |
| JP | 2009-541796 A | 11/2009 |
| JP | 2010-501894 A | 1/2010 |
| JP | 2010-526749 A | 8/2010 |
| WO | WO-98/02389 A1 | 1/1998 |
| WO | WO-2004/020357 A2 | 3/2004 |
| WO | WO-2005/021455 A2 | 3/2005 |
| WO | WO-2006/112918 A1 | 10/2006 |
| WO | WO-2007/149344 A1 | 12/2007 |
| WO | WO-2008/024255 A2 | 2/2008 |
| WO | WO-2008/136929 A1 | 11/2008 |

* cited by examiner

OPTICAL FIBER PREFORM, METHOD FOR PRODUCING OPTICAL FIBER, AND OPTICAL FIBER

TECHNICAL FIELD

The present invention relates to an optical fiber preform, a method for producing an optical fiber, and an optical fiber.

BACKGROUND ART

Optical fibers which are made of silica glass and which include cores doped with an alkali metal element are known (PTLs 1 to 9). It is said that in the case where the core portion of an optical fiber preform is doped with the alkali metal element, the viscosity of the core portion can be reduced during drawing of the optical fiber preform, relaxation of a network structure of the silica glass proceeds and, thereby, an attenuation of the optical fiber can be reduced.

As a method for doping the silica glass with the alkali metal element, the diffusion method is known (PTLs 1 and 2). In the diffusion method, a glass pipe is heated from the outside or plasma is generated in the glass pipe while a vapor of the alkali metal element or an alkali metal salt, which serves as a source material, is introduced into the glass pipe. The inside surface of the glass pipe is thereby doped with the alkali metal element by diffusion.

After the vicinity of the inside surface of the glass pipe is doped with the alkali metal element as described above, the diameter of the resulting glass pipe is reduced by heating. After the reduction in diameter, some thickness of the inside surface of the glass pipe is etched for the purpose of removing transition metal elements, e.g., Ni and Fe, which are added at the same time with addition of the alkali metal element. The alkali metal element diffuses faster than the transition metal element. Therefore, even when some thickness of glass surface is etched to remove the transition metal element, it is possible to allow the alkali metal element to remain. After the etching, the glass pipe is heated and collapsed, so that an alkali metal element-doped core rod is produced. A cladding portion having a refractive index smaller than that of the core portion including the resulting rod is synthesized on the outside of the alkali metal element-doped core rod, so that an optical fiber preform is produced. Then, an optical fiber can be produced by drawing the resulting optical fiber preform.

SUMMARY OF INVENTION

Technical Problem

It is an object of the present invention to provide an easily producible optical fiber preform which is drawn to an optical fiber having a core containing a sufficient concentration of alkali metal element. It is an object of the present invention to provide a method which can produce an optical fiber exhibiting a reduced attenuation by drawing such an optical fiber preform. In addition, it is an object of the present invention to provide an optical fiber exhibiting a reduced attenuation by drawing such an optical fiber preform.

Solution to Problem

An optical fiber preform according to the present invention is an optical fiber preform is composed of silica-based glass and including a core portion containing an alkali metal at an average concentration of 5 atomic ppm or more, a first cladding portion which is disposed on the perimeter of the core portion and which has a OH group having a concentration of 200 mol ppm or more in the perimeter portion, and a second cladding portion disposed on the perimeter of the first cladding portion. The concentration of the OH group in the perimeter portion of the first cladding is calculated by $$\text{OH group concentration [ppm]} = A/(6200 \times d \text{ [mm]}) \times 10^7 \text{ [ppm]}$$

on the basis of an increment A of absorbance of infrared light from the base line on the first cladding side of a border between the first cladding and the second cladding in a disc prepared by cutting the optical fiber preform into a round slice. The wave number of the infrared light used for the measurement is 3,673 cm$^{-1}$, and the spot diameter is 150 μm.

The concentration of the OH group in the perimeter portion of the first cladding portion may be 2,000 mol ppm or more. The first cladding portion may have an outside diameter which becomes 30 μm or more and 45 μm or less with respect to an optical fiber drawn from the optical fiber preform. The average value of the alkali metal concentration of the core portion may be 500 atomic ppm or less. The average value of an OH group concentration of the core portion may be 0.01 mol ppm or less. The second cladding portion may be made transparent by sintering a silica glass soot synthesized in a vapor phase on the perimeter of the first cladding portion. The relative refractive index difference between the first cladding portion and the second cladding portion may be 0.01% or more. The core portion may further contain a chlorine element and a fluorine element, and the average value of the dopant concentration excluding the alkali metal element, the chlorine element, and the fluorine element may be 10 atomic ppm or less.

The core portion may include a first core portion which includes a central axis and which has a maximum value of the alkali metal concentration of 100 atomic ppm or more and an average value of the chlorine concentration of 1,000 atomic ppm or less, and a second core portion which is disposed on the perimeter of the first core portion and which has an average value of the alkali metal concentration of 10 atomic ppm or less and an average value of the chlorine concentration of 1,000 atomic ppm or more.

In a method for producing an optical fiber, according to the present invention, an optical fiber exhibiting an attenuation of 0.180 dB/km or less at a wavelength of 1,550 nm and an attenuation of 0.80 dB/km or less at a wavelength of 1,380 nm is produced by drawing the optical fiber preform according to the present invention.

An optical fiber according to the present invention is an optical fiber produced by drawing the optical fiber preform according to the present invention and includes a core corresponding to the core portion, containing the alkali metal element, and having a residual compressive stress, a first cladding being disposed on the perimeter of the core, having an outside diameter of 30 μm or more and 45 μm or less, corresponding to the first cladding portion, and having a residual compressive stress, and a second cladding being disposed on the perimeter of the first cladding and corresponding to the second cladding portion, wherein the attenuation is 0.185 dB/km or less at a wavelength of 1,550 nm and the attenuation is 0.80 dB/km or less at a wavelength of 1,380 nm.

The concentration of the OH group may be 1 mol ppm or more in the interfacial region between the first cladding and the second cladding. The concentration of the OH group in the interfacial region between the first cladding and the second cladding of the optical fiber is determined by calculation on the basis of the attenuation of the light, which propagates in a base mode, with a wavelength of 1.38 μm and the position of the interfacial region between the first cladding and the second cladding. Meanwhile, the average value of the alkali metal concentration of the core may be 0.2 ppm or more.

Advantageous Effects of Invention

According to the present invention, an easily producible optical fiber preform which is drawn to an optical fiber having a core containing a sufficient concentration of alkali metal can be provided.

DESCRIPTION OF EMBODIMENTS

Figure 1:
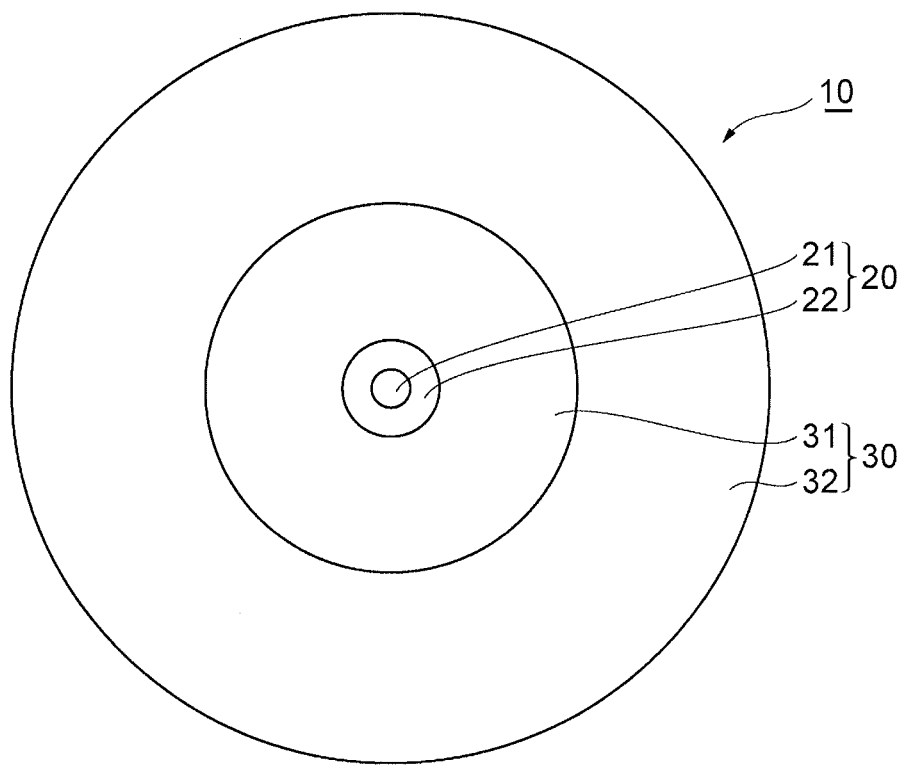
FIG. 1 is a sectional view of an optical fiber preform according to an embodiment of the present invention.

Embodiments of the present invention will be described below in detail with reference to attached drawings. In this regard, in the explanation of the drawings, the same elements are indicated by the identical reference numerals and explanations will not be redundantly repeated.

The diffusion coefficient of the alkali metal element in silica glass is an order or more of magnitude larger than the diffusion coefficients of transition metal elements, e.g., Ni and Fe. The optical fiber preform is heated to a temperature of 1,700° C. or higher during drawing, and at such a high-temperature state, diffusion of the alkali metal element in the optical fiber preform is very fast. For example, if the diffusion coefficient is assumed $1 \times 10^{-6}$ cm$^2$/s and the heating time is assumed 0.5 seconds, the diffusion length results in 14 μm. This diffusion length is large as compared with a core radius of 5 μm of a usual optical fiber. Consequently, the alkali metal element added to the core portion of the optical fiber preform diffuses significantly up to the cladding of the optical fiber. As a result of this diffusion, the average concentration of the alkali metal in the core of the optical fiber becomes about one-hundredth the average concentration of the alkali metal in the core portion of the optical fiber preform and, thereby, becomes very low.

Therefore, in order to reduce the attenuation of the optical fiber sufficiently, it has been necessary that the alkali metal in the core portion of the optical fiber preform is added at a high concentration of several hundred atomic ppm to several thousand atomic ppm. However, in order to add such a high concentration of alkali metal to the silica glass, it is necessary to decrease the thickness of a silica glass pipe such that temperature of the inside surface is very high during a diffusion step or to significantly increase the concentration of a vapor of the alkali metal element during the diffusion step. Consequently, it is difficult to add a high concentration of alkali metal to the silica glass. In this regard, even when the alkali metal can be added at a high concentration, crystallization occurs very easily in each of diffusion, etching, and collapse steps to produce an alkali metal element-doped core rod and, thereby, there is a problem in that the productivity is poor.

FIG. 1 is a sectional view of an optical fiber preform 10 according to an embodiment of the present invention. The optical fiber preform 10 is composed of silica-based glass and includes a core portion 20 and a cladding portion 30. The core portion 20 includes a first core portion 21 including a central axis and a second core portion 22 disposed on the perimeter of the first core portion 21. The cladding portion 30 includes a first cladding portion 31 disposed on the perimeter of the second core portion 22 and a second cladding portion 32 disposed on the perimeter of the first cladding portion 31. The core portion 20 contains an alkali metal at an average concentration of 5 atomic ppm or more. The OH group concentration in the perimeter portion of the first cladding portion 31 is 200 mol ppm or more. In this regard, the OH group concentration profile is almost symmetric with respect to an axis because of the feature of the method for producing the optical fiber preform. The OH group concentrations in the perimeter portion of the first cladding portion 31 at one cross-section (section perpendicular to the major axis) are almost equal. Therefore, it is enough that the OH group concentration is measured at one position on the first cladding side of a border between the first cladding and the second cladding in a disc prepared by cutting the optical fiber preform into a round slice.

A preferable aspect of the optical fiber preform 10 is as described below. Preferably, the first cladding portion 31 has an outside diameter corresponding to the diameter of 30 μm or more and 45 μm or less in an optical fiber drawn from the optical fiber preform 10. More preferably, the first cladding portion 31 has an outside diameter corresponding to the diameter of 30 μm or more and 40 μm or less in the optical fiber. Preferably, the average value of the alkali metal concentration in the core portion 20 is 500 atomic ppm or less. Preferably, the average value of the OH group concentration in the core portion 20 is 0.01 mol ppm or less. Preferably, the second cladding portion 32 is made transparent by sintering a silica glass soot synthesized on the perimeter of the first cladding portion 31 through vapor phase synthesis. Preferably, the relative refractive index difference between the first cladding portion 31 and the second cladding portion 32 is 0.01% or more.

Preferably, the core portion 20 further contains a chlorine element and a fluorine element, and the concentration of the dopants (transition metals and typical metals, e.g., Ge, Al, Ni, and Fe) excluding the alkali metal element, the chlorine element, and the fluorine element in the core portion 20 is 10 atomic ppm or less on an average value of the whole core portion basis. Preferably, the maximum value of the alkali metal concentration in the first core portion 21 is 100 atomic ppm or more and the average value of the chlorine concentration is 1,000 atomic ppm or less, while the average value of the alkali metal concentration in the second core portion 22 is 10 atomic ppm or less and the average value of the chlorine concentration is 1,000 atomic ppm or more.

Figure 2:
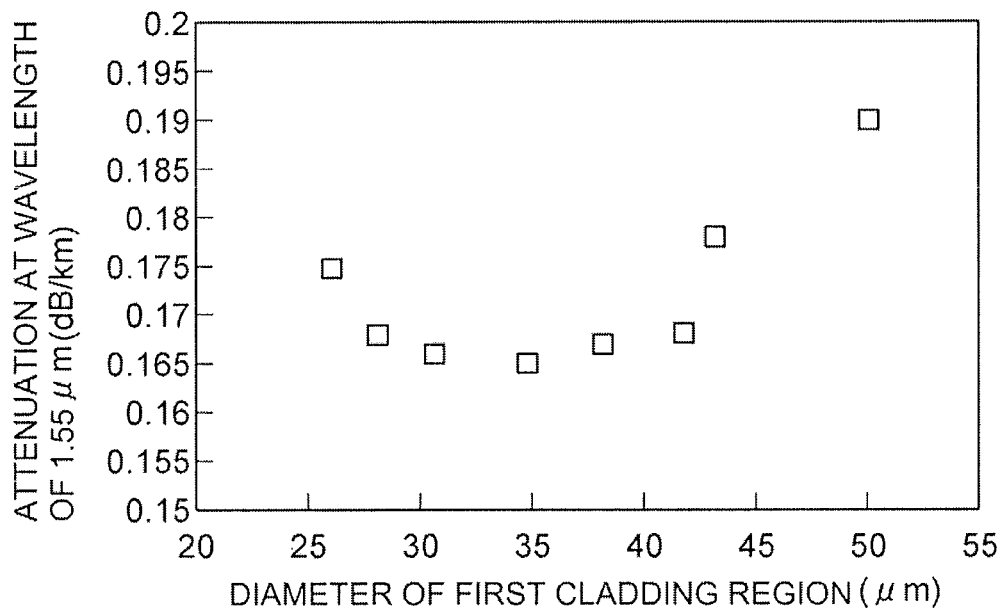
FIG. 2 is a graph showing the relationship between the outside diameter of a first cladding of an optical fiber and the attenuation at a wavelength of 1.55 μm.

FIG. 2 is a graph showing the relationship between the outside diameter of a first cladding of an optical fiber and the attenuation at a wavelength of 1.55 μm. The first cladding of the optical fiber corresponds to the first cladding portion of the optical fiber preform. Here, the alkali metal concentration in the core portion 20 of the optical fiber preform 10 was specified to be about 10 atomic ppm in average, and the water concentration in the perimeter portion of the first cladding portion 32 was specified to be about 500 molecular ppm. The core portion 20 was doped with halogen elements, e.g., chlorine and fluorine, and alkali metal elements, and the content of the other transition metal elements, e.g., Ni and Fe, $GeO_2$, and the like was specified to be 1 ppm or less. The first cladding portion 31 was doped with the fluorine element, and the refractive index of the first cladding portion 31 was specified to be lower than the refractive index of the core portion 20. In addition, the second cladding portion 32 made of fluorine-doped $SiO_2$ glass was synthesized on the perimeter of the first cladding portion 31 by an OVD method.

Preferably, the outside diameter of the first cladding portion 31 corresponds to the diameter of 45 μm or less in the resulting optical fiber because the attenuation at a wavelength of 1,550 nm becomes 0.18 dB/km or less, and more preferably the outside diameter corresponds to the diameter of 40 μm or less because the attenuation at a wavelength of 1,550 nm becomes 0.175 dB/km or less. The reason for this is believed to be that the OH group in the perimeter portion of the first cladding portion 31 suppresses diffusion of alkali metal element during drawing and, thereby, the alkali metal concentration in the core of the optical fiber can be maintained at a relatively high level. This suppression of alkali metal element diffusion can be examined by measuring the residual stress of the optical fiber. That is, in the region, into which the alkali metal element has diffused, the viscosity of the silica glass decreases and, therefore, a compressive stress remains. On the other hand, in a region, into which diffusion has not occurred, the viscosity of the silica glass is maintained at a high level and, therefore, a tensile stress remains.

Figure 4:
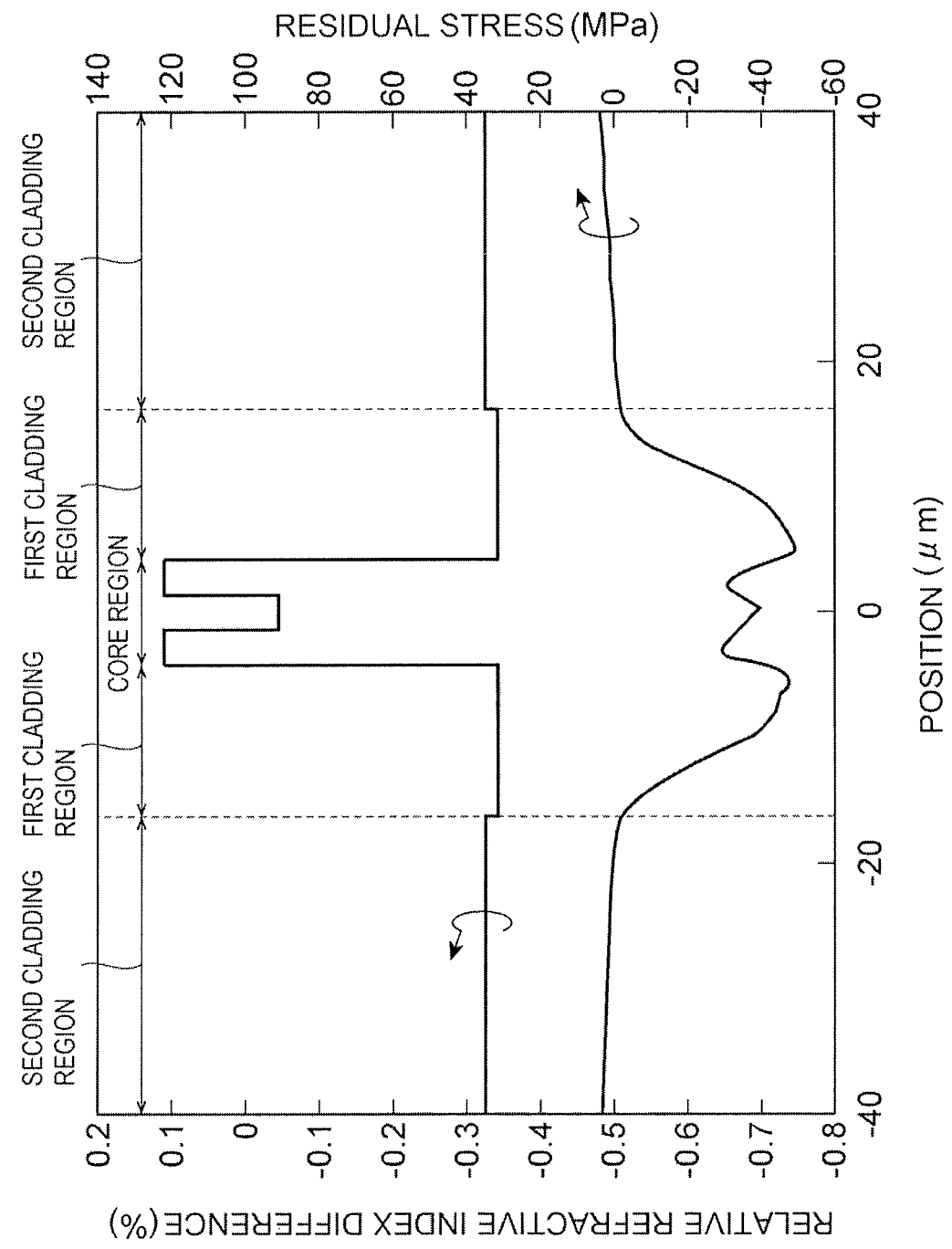
FIG. 4 is a graph showing each of the relative refractive index difference and the residual stress at points on one diameter of an optical fiber.

FIG. 4 is a graph showing each of the relative refractive index difference and the residual stress at points on one diameter of an optical fiber. Here, the relative refractive index difference is a value with reference to the refractive index of pure silica glass. The residual stress is a compressive stress when the value is negative and is a tensile stress when the value is positive. In the perimeter portion of the first cladding of the optical fiber (a position corresponding to the perimeter portion of the first cladding portion 31 of the optical fiber preform 10), the residual stress of the optical fiber changes from a compressive stress to a tensile stress (from negative sign to positive sign) in the direction from the inside to the outside of the first cladding. As is clear from this, diffusion of the alkali metal element is suppressed in the perimeter portion of the first cladding portion 31, to which large amounts of water has been added. In this regard, the reason the diffusion can be suppressed is estimated that high concentration of water is present in the perimeter portion of the first cladding portion 31, the water reacts with the alkali metal element, and further movement of the alkali metal element is restricted.

In addition, it is preferable that a compressive stress remain in the core of the optical fiber. If a tensile stress remains in the optical fiber, a scattering loss may increase. Meanwhile, if there is a large residual stress difference in the vicinity of the interface between the core and the first cladding of the optical fiber, the attenuation may increase. Therefore, it is more preferable that the compressive stress remain in both the core and the first cladding of the optical fiber. In order to allow the residual stress to efficiently remain in both the core and the first cladding of the optical fiber, as described above, it is preferable that diffusion of the alkali metal element be limited to within the inside of the first cladding portion 31 by the high concentration of water added to the perimeter portion of the first cladding portion 31, as in the optical fiber preform 10.

Figure 3:
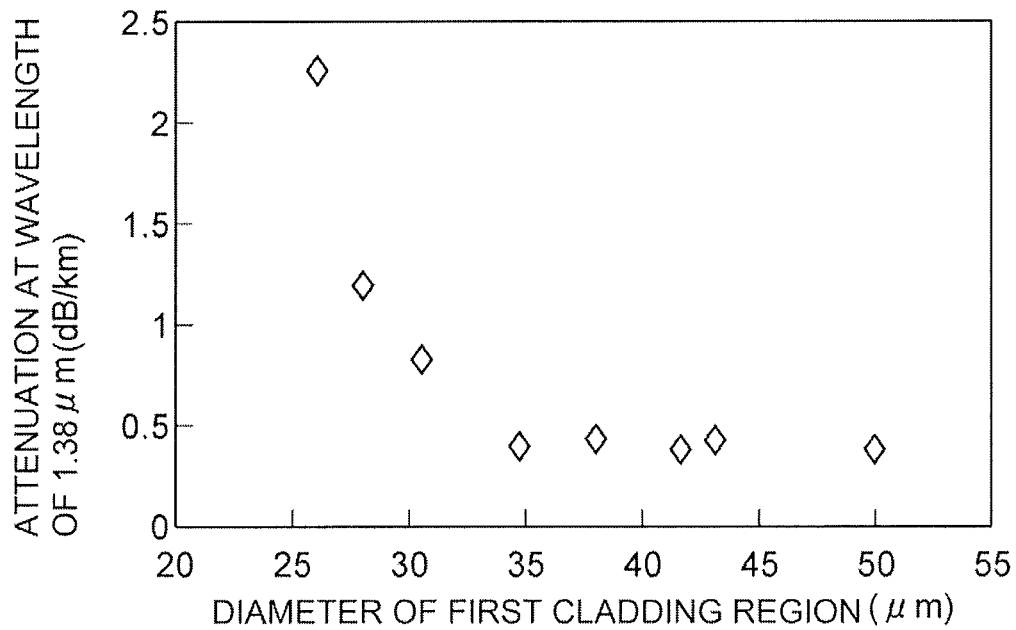
FIG. 3 is a graph showing the relationship between the outside diameter of a first cladding of an optical fiber and the attenuation at a wavelength of 1.38 μm.

FIG. 3 is a graph showing the relationship between the outside diameter of a first cladding of an optical fiber and the attenuation at a wavelength of 1.38 μm. In the case where the diameter of the first cladding of the optical fiber is 30 μm or less, the attenuation in a 1.38 μm wavelength band is increased by the OH group, and the attenuation at a wavelength of 1,380 nm becomes a very high such as 0.8 dB/km or more. Therefore, it is preferable that the outside diameter of the first cladding portion 31 be 30 μm or more in terms of a diameter in the resulting optical fiber.

According to the photoelastic effect, in the case where the residual stress in the optical fiber is a compressive stress, the refractive index increases and in the case where the residual stress is a tensile stress, the refractive index decreases. Consequently, in the optical fiber preform 10, it is desirable that the average refractive index of the second cladding portion 32 is higher than the average refractive index of the first cladding portion 31 by 0.01% or more in terms of relative refractive index difference.

In order to reduce the attenuation of the optical fiber sufficiently, preferably, the average alkali metal concentration in the core of the optical fiber is 0.2 atomic ppm or more. In this regard, in the case where the average alkali metal concentration in the core of the optical fiber is more than 50 atomic ppm, the radiation resistance is degraded. Therefore, it is desirable that the average alkali metal concentration in the core of the optical fiber for a submarine cable be 50 atomic ppm or less.

In order to reduce the attenuation of the optical fiber sufficiently, it is preferable that the average alkali metal concentration in the core portion 20 of the optical fiber preform 10 be 5 atomic ppm or more. The average alkali metal concentration in the core portion 20 of the optical fiber preform 10 is 500 atomic ppm or less, and preferably 100 atomic ppm or less. Consequently, the productivity of the alkali metal element-doped core rod can be improved.

It is preferable that 200 mol ppm or more of OH group be present in the perimeter portion of the first cladding portion 31 of the optical fiber preform 10. This is because the OH group concentration in the perimeter portion of the first cladding portion 31 is sufficiently higher than the average alkali metal concentration in the core portion 20 and, thereby, several ppb to several ppm of alkali metal element which reaches the interface between the first cladding and the second cladding of the optical fiber by diffusion during drawing can react with the OH group reliably.

In order to efficiently add the water to the perimeter portion of the first cladding portion 31 of the optical fiber preform 10, preferably, the perimeter portion of the first cladding portion 31 is heated by an oxyhydrogen flame, and preferably, synthesis of the second cladding portion 32 is performed by a vapor phase synthesis method, e.g., a VAD method or an OVD method. Meanwhile, the OH group concentration in the perimeter portion of the first cladding portion 31 of the optical fiber preform 10 is preferably 2,000 mol ppm or less because an excessively high concentration of OH group causes an increase in the attenuation of the optical fiber. As for the optical fiber, an increase in loss due to Si—OH absorption occurs in a 1.38 μm wavelength band, so that a smaller amount of addition of water is preferable in the vicinity of the core portion 20. Preferably, the OH group concentration in the core portion 20 is 0.01 mol ppm or less in average.

As for the first core portion 21, preferably, the alkali metal concentration is 100 atomic ppm or more at the peak and the chlorine concentration is 1,000 atomic ppm or less in average. As for the second core portion 22, preferably, the alkali metal concentration is 10 atomic ppm or less at the peak and the chlorine concentration is 2,000 atomic ppm or more in average. Consequently, the attenuation of the optical fiber can be reduced.

The reason for the reduction of the attenuation of the optical fiber is estimated as described below. The alkali metal element added to the silica glass reacts with the chlorine element during heating to produce an alkali chloride. In a bulk glass, such as, the optical fiber preform 10, the alkali chloride causes bubbles and crystals. Therefore, a high concentration of chlorine is not added together to a region, e.g., the first core portion 21, doped with a high concentration of alkali metal. On the other hand, in the case of, for example, the optical fiber having a small diameter and cooling under a very large cooling rate, bubbles, crystals, and the like are not generated easily even when the alkali metal element and the chlorine element are added together. Consequently, it is estimated that the attenuation of the optical fiber can be reduced by reacting part of alkali metal element which diffuses in drawing of the optical fiber preform 10 with the chlorine element in the core portion 20 to remain as the alkali chloride in the core.

The maximum value of relative refractive index difference of the core portion 20 may be 0.25% or more and 0.55% or less with reference to the refractive index of the cladding portion 30 (in this regard, in the case where the cladding portion 30 has a multilayer structure, the refractive index at a radius position corresponding to about 3 times the outside diameter of the core portion 20). The core radius of the optical fiber may be 3 μm or more and 7.0 μm or less.

The lower attenuation of the optical fiber is more preferable. It is desirable that the attenuation of the optical fiber at a wavelength of 1,550 nm be less than 0.180 dB/km, further desirably 0.175 dB/km or less, and most preferably 0.170 dB/km or less. Preferably, the core of the optical fiber is silica glass doped with halogens, e.g., chlorine and fluorine, and alkali metal elements, e.g., potassium, sodium, and rubidium. The concentration of dopants, such as, typical metal elements, e.g., Ge and Al, and transition metal elements, e.g., Ni and Cu, other than them in the optical fiber is preferably 10 atomic ppm or less, further preferably 1 atomic ppm or less, and most preferably 0.1 atomic ppm or less.

The attenuation of the optical fiber at a wavelength of 1,380 nm is preferably a small 0.8 dB/km or less, further preferably 0.4 dB/km or less, and most preferably 0.3 dB/km or less. The polarization mode dispersion of the optical fiber may be 0.2 ps/√km or less. The cable cutoff wavelength of the optical fiber is preferably 1,520 nm or less, and further preferably 1,450 nm or less serving as a pump wavelength used for Raman amplification.

Figure 5:
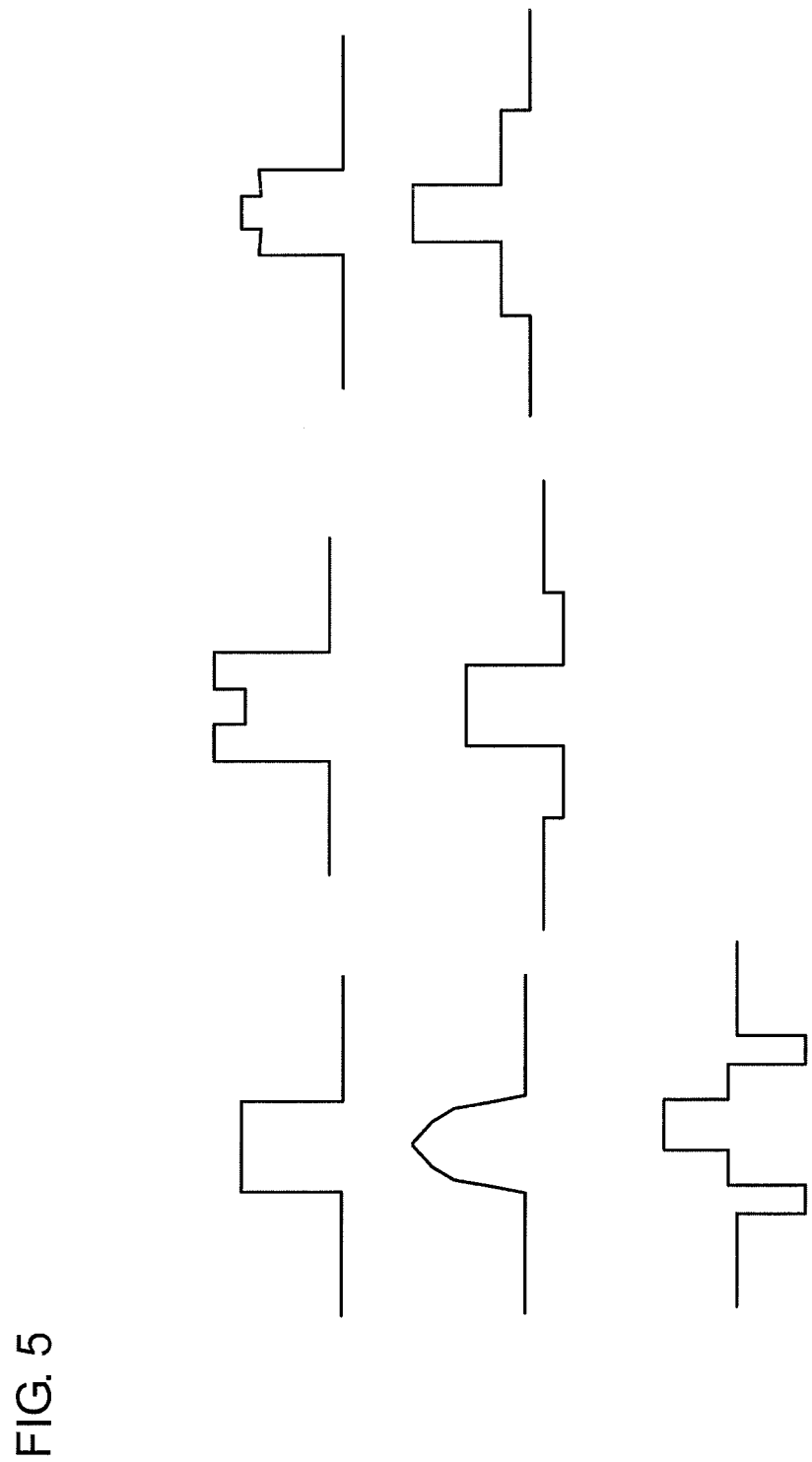
FIG. 5 is a conceptual diagram of examples of refractive index profiles of an optical fiber preform.

In each portion of the core portion and the cladding portion of the optical fiber preform according to the present invention, their respective refractive indices may be varied. The optical fiber preform according to the present invention may have profiles schematically shown in FIG. 5, although not limited to them.

Example 1

In Example 1, an optical fiber preform and an optical fiber were produced by performing the individual treatments of the following Step S1 to Step S10 sequentially and the attenuation of the resulting optical fiber was evaluated. In Step S1, a glass pipe made of silica glass was prepared. The resulting glass pipe was substantially a pure silica glass containing 100 atomic ppm of chlorine and 6,000 atomic ppm of fluorine as dopants, where the concentration of the other impurities was 10 ppm or less. The outside diameter of this glass pipe was 35 mm and the inside diameter was about 20 mm.

Figure 6:
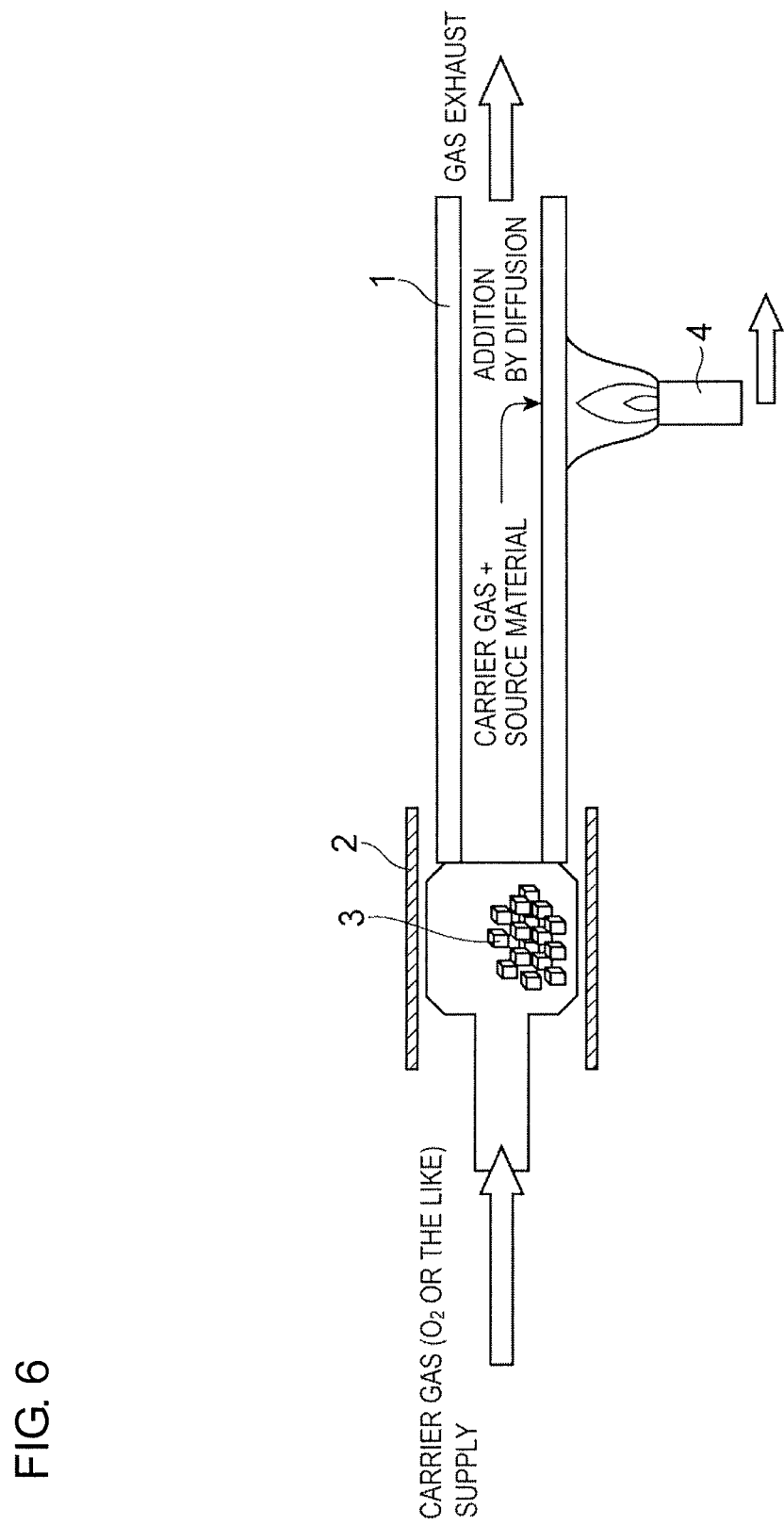
FIG. 6 is a conceptual diagram illustrating an example of an alkali metal element addition step in a method for producing an optical fiber preform according to the present invention.

In Step S2, as shown in FIG. 6, potassium bromide (KBr) was used as a source material 3 for alkali metal, and this was heated to a temperature of 840° C. by an external heat source 2 to generate a KBr vapor. Subsequently, a glass pipe 1 was heated by a high temperature plasma flame 4 serving as an external heat source in such a way that the outside surface of the glass pipe 1 became at 2,050° C. while the KBr vapor was introduced into the glass pipe 1 together with oxygen introduced as a carrier gas at a flow rate of 1 SLM (1 liter/min on a standard state basis). The high temperature plasma flame was traversed at a speed of 30 mm/min, and heating was performed 20 turns in total, so that a potassium metal element was added to the inside surface of the glass pipe 1 by diffusion.

In Step S3, the glass pipe doped with the potassium metal element was heated by a high temperature plasma flame 4 in such a way that the outside surface of the glass pipe became at 2,100° C. while oxygen (2 SLM) was passed through the glass pipe. The high temperature plasma flame was traversed at a speed of 40 mm/min, and heating was performed 6 turns in total, so that the inside diameter of the glass pipe doped with the potassium metal element was decreased to 3 mm.

In Step S4, the glass pipe doped with the potassium metal element was heated by a high temperature plasma flame 4 in such a way that vapor phase etching was induced while a mixed gas of $SF_6$ (0.05 SLM), a chlorine gas (0.5 SLM), and a He gas (0.5 SLM) was introduced into the glass pipe. The inside diameter of the glass pipe was thereby increased to 3.4 mm.

In Step S5, the absolute pressure in the glass pipe was decreased to 97 kPa while oxygen (1 SLM) was introduced into the glass pipe, and the surface temperature was specified to be 1,400° C. by the high temperature plasma flame 4, so that collapse was induced and an alkali metal element-doped core glass rod having a diameter of 28 mm was produced. In order to make the alkali metal element-doped glass pipe into a collapsed glass body without generating bubbles and crystals, it is desirable that the inside pressure of the glass pipe be 100 kPa or less on an absolute pressure basis. In this regard, it is further desirable that 1 kPa or less be employed because the working speed to collapse can be increased and diffusion of the alkali metal due to heating can be suppressed. The maximum value of the potassium concentration of the alkali metal element-doped core glass rod was 1,800 ppm, and the diameter of the region doped with 10 atomic ppm or more of potassium was 12 mm.

In Step S6, the alkali metal element-doped core glass rod was elongated in such a way that the diameter became 20 mm and, thereafter, the perimeter portion of the alkali metal element-doped core glass rod was ground in such a way that the diameter became 12 mm to produce a first core portion.

In Step S7, a silica glass doped with 5,000 atomic ppm of chlorine (second core portion) was disposed on the outside of the alkali metal element-doped core glass rod in such a way that the outside diameter became 65 mm, elongation was performed in such a way that the diameter became 24 mm and, thereafter, the perimeter portion was ground in such a way that the diameter became 20 mm to produce a core glass rod. The first core portion and the second core portion were combined to produce a core of the optical fiber. The alkali metal concentration of this core portion was 50 atomic ppm in average. In synthesis of the glass of the second core portion, a rod-in-collapse method was used, in which a silica glass pipe doped with 6,000 atomic ppm of chlorine was prepared, the alkali metal element-doped core glass rod was inserted into this glass pipe, and both were heated and integrated by an external heat source. As a result, the ratio D2/D1 of the diameter (D2) of the second core portion to the diameter (D1) of the first core portion was 4.5.

In Step S8, a first cladding portion (optical cladding glass portion) made of silica glass doped with the fluorine element was synthesized on the outside of the core glass rod. The maximum relative refractive index difference between the second core portion and the first cladding portion was about 0.34%. In synthesis of the first cladding portion, a rod-in-collapse method was used, in which a silica glass pipe doped with the fluorine element was prepared, the core glass rod was inserted into this, and heating and integration were performed by an external heat source. As a result of synthesis by this rod-in-collapse method, the amount of water in the core glass rod and the first cladding portion in the vicinity thereof was able to be decreased to a sufficiently low level.

In Step S9, the core glass rod with the first cladding portion was subjected to working, e.g., elongation to a predetermined diameter, and thereafter, silica glass doped with the fluorine element (second cladding portion) was synthesized on the outside of the glass rod to produce an optical fiber preform. The outside diameter of the first cladding portion was 36 mm, and the outside diameter of the second cladding portion was 140 mm. The maximum relative refractive index difference between the second core portion and the second cladding portion was about 0.32%. In synthesis of the second cladding portion, the OVD method was used. Meanwhile, as a result of measurement of OH group concentration by using infrared absorption spectroscopy, the OH group concentration at the interface between the first cladding portion and the second cladding portion was about 400 mol ppm at the peak.

In Step S10, an optical fiber was produced by drawing the optical fiber preform. At this time, the drawing speed was 2,300 m/min, and the drawing tension was 0.5 N.

Various characteristics of the optical fiber produced as described above are as shown in Table. In this manner, the optical fiber exhibiting low attenuation was obtained.
Table 10 ppm or less. The outside diameter of this glass pipe was 25 mm and the inside diameter was about 10 mm in diameter.

In Step S2, as shown in FIG. 6, potassium bromide (KBr) was used as a source material 3 for alkali metal, and this was heated to a temperature of 820° C. by an external heat source 2 to generate a KBr vapor. Subsequently, a glass pipe 1 was heated by an oxyhydrogen flame 4 serving as an external heat source in such a way that the outside surface of the glass pipe 1 became at 2,050° C. while the KBr vapor was introduced into the glass pipe 1 together with oxygen introduced as a carrier gas at a flow rate of 1 SLM (1 liter/min on a standard state basis). The oxyhydrogen flame was traversed at a speed of 30 mm/min, and heating was performed 15 turns in total, so that a potassium metal element was added to the inside surface of the glass pipe 1 by diffusion.

In Step S3, the glass pipe doped with the potassium metal element was heated by an oxyhydrogen flame 4 in such a way that the outside surface of the glass pipe became at 2,100° C. while oxygen (2 SLM) was passed through the glass pipe. The oxyhydrogen flame was traversed at a speed of 40 mm/min, and heating was performed 8 turns in total, so that the inside diameter of the glass pipe doped with the potassium metal element was decreased to 3 mm.

In Step S4, the glass pipe doped with the potassium metal element was heated by a high temperature plasma flame 4 in such a way that vapor phase etching was induced while a mixed gas of $SF_6$ (0.05 SLM) and oxygen (1 SLM) was introduced into the glass pipe. The inside diameter of the glass pipe was thereby increased to 3.3 mm.

In Step S5, the absolute pressure in the glass pipe was decreased to 1 kPa while oxygen (1 SLM) was introduced into the glass pipe, and the surface temperature was specified to be 1,400° C. by the high temperature plasma flame 4, so that collapse was induced and an alkali metal element-doped core glass rod having a diameter of 22 mm was produced. The maximum value of the potassium concentration of the alkali

| Item | | unit | Example 1 | Example 2 |
|---|---|---|---|---|
| Potassium concentration in core | average value | atomic ppm | about 3 | about 0.4 |
| Attenuation | at 1300 nm | dB/km | 0.287 | 0.29 |
|  | at 1380 nm | dB/km | 0.292 | 0.28 |
|  | at 1550 nm | dB/km | 0.163 | 0.161 |
| Chromatic dispersion | at 1550 nm | ps/nm/km | 15.9 | 21.1 |
| Dispersion slope | at 1550 nm | ps/nm$^2$/km | 0.054 | 0.061 |
| Zero dispersion wavelength | — | nm | 1310 | — |
| Dispersion slope | at zero dispersion wavelength | ps/nm$^2$/km | 0.083 | — |
| Effective cross-sectional area | at 1550 nm | μm$^2$ | 82 | 145 |
| Mode field diameter | at 1550 nm | μm | 10.3 | 12.9 |
|  | at 1310 nm | μm | 9.1 | — |
| Fiber cutoff wavelength | 2 m | nm | 1310 | 1610 |
| Cable cutoff wavelength | 22 m | nm | 1230 | 1480 |
| Polarization mode dispersion | C band & L band | ps/√km | 0.11 | 0.01 |
| Nonlinear coefficient | at 1550 nm with random polarization mode | $(W \cdot km)^{-1}$ | 1.1 | 0.6 |

Example 2

In Example 2, an optical fiber preform and an optical fiber were produced by performing the individual treatments of the following Step S1 to Step S10 sequentially and the attenuation of the resulting optical fiber was evaluated. In Step S1, a glass pipe made of silica glass was prepared. The resulting glass pipe was substantially a pure silica glass containing 50 atomic ppm of chlorine and 7,000 atomic ppm of fluorine as dopants, where the concentration of the other impurities was metal element-doped core glass rod was 1,300 ppm, and the diameter of the region doped with 10 atomic ppm or more of potassium was 7 mm.

In Step S6, the alkali metal element-doped core glass rod was elongated in such a way that the diameter became 17 mm and, thereafter, the perimeter portion of the alkali metal element-doped core glass rod was ground in such a way that the diameter became 10 mm to produce a first core portion.

In Step S7, a silica glass doped with 13,000 atomic ppm of chlorine (second core portion) was disposed on the outside of the alkali metal element-doped core glass rod in such a way that the outside diameter became 35 mm, elongation was performed in such a way that the diameter became 24 mm and, thereafter, the perimeter portion was ground in such a way that the diameter became 20 mm to produce a core glass rod. The first core portion and the second core portion were combined to produce a core of the optical fiber. The alkali metal concentration of this core portion was 15 atomic ppm in average. In synthesis of the glass of the second core portion, a rod-in-collapse method was used, in which a silica glass pipe doped with 13,000 atomic ppm of chlorine was prepared, the alkali metal element-doped core glass rod was inserted into this glass pipe, and both were heated and integrated by an external heat source. As a result, the ratio D2/D1 of the diameter (D2) of the second core portion to the diameter (D1) of the first core portion was 2.9.

In Step S8, a first cladding portion (optical cladding glass portion) made of silica glass doped with the fluorine element was synthesized on the outside of the core glass rod. The maximum relative refractive index difference between the second core portion and the first cladding portion was about 0.26%. In synthesis of the first cladding portion, a rod-in-collapse method was used, in which a silica glass pipe doped with the fluorine element was prepared, the core glass rod was inserted into this, and heating and integration were performed by an external heat source. As a result of synthesis by this rod-in-collapse method, the amount of water in the core glass rod and the first cladding portion in the vicinity thereof was able to be decreased to a sufficiently low level.

In Step S9, the core glass rod with the first cladding portion was subjected to working, e.g., elongation to a predetermined diameter, and thereafter, silica glass doped with the fluorine element (second cladding portion) was synthesized on the outside of the glass rod to form an optical fiber preform. The outside diameter of the first cladding portion was 40 mm, and the outside diameter of the second cladding portion was 145 mm. The maximum relative refractive index difference between the second core portion and the second cladding portion was about 0.22%. In synthesis of the second cladding portion, the VAD method was used. Meanwhile, as a result of measurement of OH group concentration by using infrared absorption spectroscopy, the OH group concentration at the interface between the first cladding portion and the second cladding portion was about 550 mol ppm at the peak.

In Step S10, an optical fiber was produced by drawing the optical fiber preform. At this time, the drawing speed was 1,700 m/min, and the drawing tension was 0.6 N.

Various characteristics of the optical fiber produced as described above are as shown in Table. In this manner, the optical fiber exhibiting low attenuation was obtained.

INDUSTRIAL APPLICABILITY

The optical fiber according to the present invention is useful as an optical fiber for an optical line which is required to have a large OSNR.

CITATION LIST

Patent Literature

PTL 1: JP 2005-537210A
PTL 2: US 2006/0130530A
PTL 3: JP 2007-504080A
PTL 4: JP 2008-536190A
PTL 5: JP 2010-501894A
PTL 6: JP 2009-541796A
PTL 7: JP 2010-526749A
PTL 8: WO 98/002389
PTL 9: U.S. Pat. No. 5,146,534B

The invention claimed is:

1. An optical fiber preform, which is composed of silica-based glass, comprising:
  a core portion including a central ax containing an alkali metal at an average concentration of 5 atomic ppm or more;
  a first cladding portion having a refractive index lower than the core portion, disposed on the perimeter of the core portion, and having a OH group having a concentration of 200 mol ppm or more in the perimeter portion; and
  a second cladding portion having a refractive index lower than the core portion and disposed on the perimeter of the first cladding portion,
  wherein the concentration of the OH group in the perimeter portion of the first cladding portion is 2,000 mol ppm or more.

2. The optical fiber preform according to claim 1,
  wherein the first cladding portion has an outside diameter which becomes 30 μm or more and 45 μm or less with respect to an optical fiber drawn from the optical fiber preform.

3. The optical fiber preform according to claim 1,
  wherein the average value of the alkali metal concentration of the core portion is 500 atomic ppm or less.

4. The optical fiber preform according to claim 1,
  wherein the average value of an OH group concentration of the core portion is 0.01 mol ppm or less.

5. The optical fiber preform according to claim 1,
  wherein the relative refractive index difference between the first cladding portion and the second cladding portion is 0.01% or more.

6. The optical fiber preform according to claim 1,
  wherein the core portion further contains a chlorine element and a fluorine element, and
  the average value of the dopant concentration excluding the alkali metal element, the chlorine element, and the fluorine element in the core portion is 10 atomic ppm or less.

7. A method for producing an optical fiber, the method comprising the step of drawing the optical fiber preform according to claim 1 to produce an optical fiber exhibiting an attenuation of 0.180 dB/km or less at a wavelength of 1,550 nm and an attenuation of 0.80 dB/km or less at a wavelength of 1,380 nm.

8. An optical fiber, which is produced by drawing the optical fiber preform according to claim 1, comprising:
  a core corresponding to the core portion and containing the alkali metal element and having a residual compressive stress;
  a first cladding being disposed on the perimeter of the core, having an outside diameter of 30 μm or more and 45 μm or less, corresponding to the first cladding portion, and having a residual compressive stress; and
  a second cladding being disposed on the perimeter of the first cladding and corresponding to the second cladding portion,
  wherein the attenuation is 0.185 dB/km or less at a wavelength of 1,550 nm and the attenuation is 0.80 dB/km or less at a wavelength of 1,380 nm.

9. The optical fiber according to claim 8,
  wherein the concentration of the OH group is 1 mol ppm or more in the interfacial region between the first cladding and the second cladding.

10. The optical fiber according to claim 8,
wherein the average value of the alkali metal concentration of the core is 0.2 ppm or more.

11. An optical fiber preform, which is composed of silica-based glass, comprising:
a core portion including a central axis and containing an alkali metal at an average concentration of 5 atomic ppm or more;
a first cladding portion having a refractive index lower than the core portion, disposed on the perimeter of the core portion, and having a OH group having a concentration of 200 mol ppm or more in the perimeter portion; and
a second cladding portion having a refractive index lower than the core portion and disposed on the perimeter of the first cladding portion,
wherein the second cladding portion is made transparent by sintering a silica glass soot synthesized in a vapor phase on the perimeter of the first cladding portion.

12. The optical fiber preform according to claim 11,
wherein the first cladding portion has an outside diameter which becomes 30 μm or more and 45 μm or less with respect to an optical fiber drawn from the optical fiber preform.

13. The optical fiber preform according to claim 11,
wherein the average value of the alkali metal concentration of the core portion is 500 atomic ppm or less.

14. The optical fiber preform according to claim 11,
wherein the average value of an OH group concentration of the core portion is 0.01 mol ppm or less.

15. The optical fiber preform according to claim 11,
wherein the relative refractive index difference between the first cladding portion and the second cladding portion is 0.01% or more.

16. The optical fiber preform according to claim 11,
wherein the core portion further contains a chlorine element and a fluorine element, and
the average value of the dopant concentration excluding the alkali metal element, the chlorine element, and the fluorine element in the core portion is 10 atomic ppm or less.

17. A method for producing an optical fiber, the method comprising the step of drawing the optical fiber preform according to claim 11 to produce an optical fiber exhibiting an attenuation of 0.180 dB/km or less at a wavelength of 1,550 nm and an attenuation of 0.80 dB/km or less at a wavelength of 1,380 nm.

18. An optical fiber, which is produced by drawing the optical fiber preform according to claim 11, comprising:
a core corresponding to the core portion and containing the alkali metal element and having a residual compressive stress;
a first cladding being disposed on the perimeter of the core, having an outside diameter of 30 μm or more and 45 μm or less, corresponding to the first cladding portion, and having a residual compressive stress; and
a second cladding being disposed on the perimeter of the first cladding and corresponding to the second cladding portion,
wherein the attenuation is 0.185 dB/km or less at a wavelength of 1,550 nm and the attenuation is 0.80 dB/km or less at a wavelength of 1,380 nm.

19. The optical fiber according to claim 18,
wherein the concentration of the OH group is 1 mol ppm or more in the interfacial region between the first cladding and the second cladding.

20. The optical fiber according to claim 18,
wherein the average value of the alkali metal concentration of the core is 0.2 ppm or more.

21. An optical fiber preform, which is composed of silica-based glass, comprising:
a core portion including a central axis and containing an alkali metal at an average concentration of 5 atomic ppm or more;
a first cladding portion having a refractive index lower than the core portion, disposed on the perimeter of the core portion, and having a OH group having a concentration of 200 mol ppm or more in the perimeter portion; and
a second cladding portion having a refractive index lower than the core portion and disposed on the perimeter of the first cladding portion,
wherein the core portion includes
a first core portion which includes a central axis and which has a maximum value of the alkali metal concentration of 100 atomic ppm or more and an average value of the chlorine concentration of 1,000 atomic ppm or less, and
a second core portion which is disposed on the perimeter of the first core portion and which has an average value of the alkali metal concentration of 10 atomic ppm or less and an average value of the chlorine concentration of 1,000 atomic ppm or more.

* * * * *